United States Patent
Apfelbeck

(10) Patent No.: US 6,578,973 B2
(45) Date of Patent: Jun. 17, 2003

(54) EXTERIOR REARVIEW MIRROR FOR VEHICLES, PREFERABLY MOTOR VEHICLES

(75) Inventor: Robert Apfelbeck, Plattling (DE)

(73) Assignee: Reitter & Schafenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/940,846

(22) Filed: Aug. 28, 2001

(65) Prior Publication Data

US 2002/0024748 A1 Feb. 28, 2002

(30) Foreign Application Priority Data

Aug. 31, 2000 (DE) .......................... 200 15 125

(51) Int. Cl.⁷ .............................. G02B 5/08; G02B 7/18
(52) U.S. Cl. ...................................... 359/841; 248/900
(58) Field of Search ........................ 359/841, 843, 359/872; 248/475.1, 549, 900

(56) References Cited

U.S. PATENT DOCUMENTS

| 4,740,066 A | * | 4/1988 | Whitehead | 359/841 |
| 4,932,766 A | * | 6/1990 | Harry | 359/841 |
| 4,951,912 A | * | 8/1990 | Manzoni | 248/475.1 |
| 5,124,846 A | * | 6/1992 | Seitz et al. | 359/843 |
| 5,657,174 A | * | 8/1997 | Boddy | 359/843 |

* cited by examiner

Primary Examiner—Mark A. Robinson
(74) Attorney, Agent, or Firm—Gudrus E. Huckett

(57) ABSTRACT

An exterior rearview mirror for motor vehicles has a mirror base and a mirror head connected to the mirror base. The mirror head is pivotable about a first pivot axis relative to the mirror base from a position of use into a parking position. A securing device exerting a securing force onto the mirror head at least in the parking position is provided. A tension spring exerting a spring force onto the mirror head is also provided, wherein the securing force counteracts the spring force. A cam disc is pivotably supported on the mirror base about a second pivot axis, wherein the mirror head has a support and wherein the tension spring has a first end connected to the cam disc and a second end connected to the support.

14 Claims, 5 Drawing Sheets

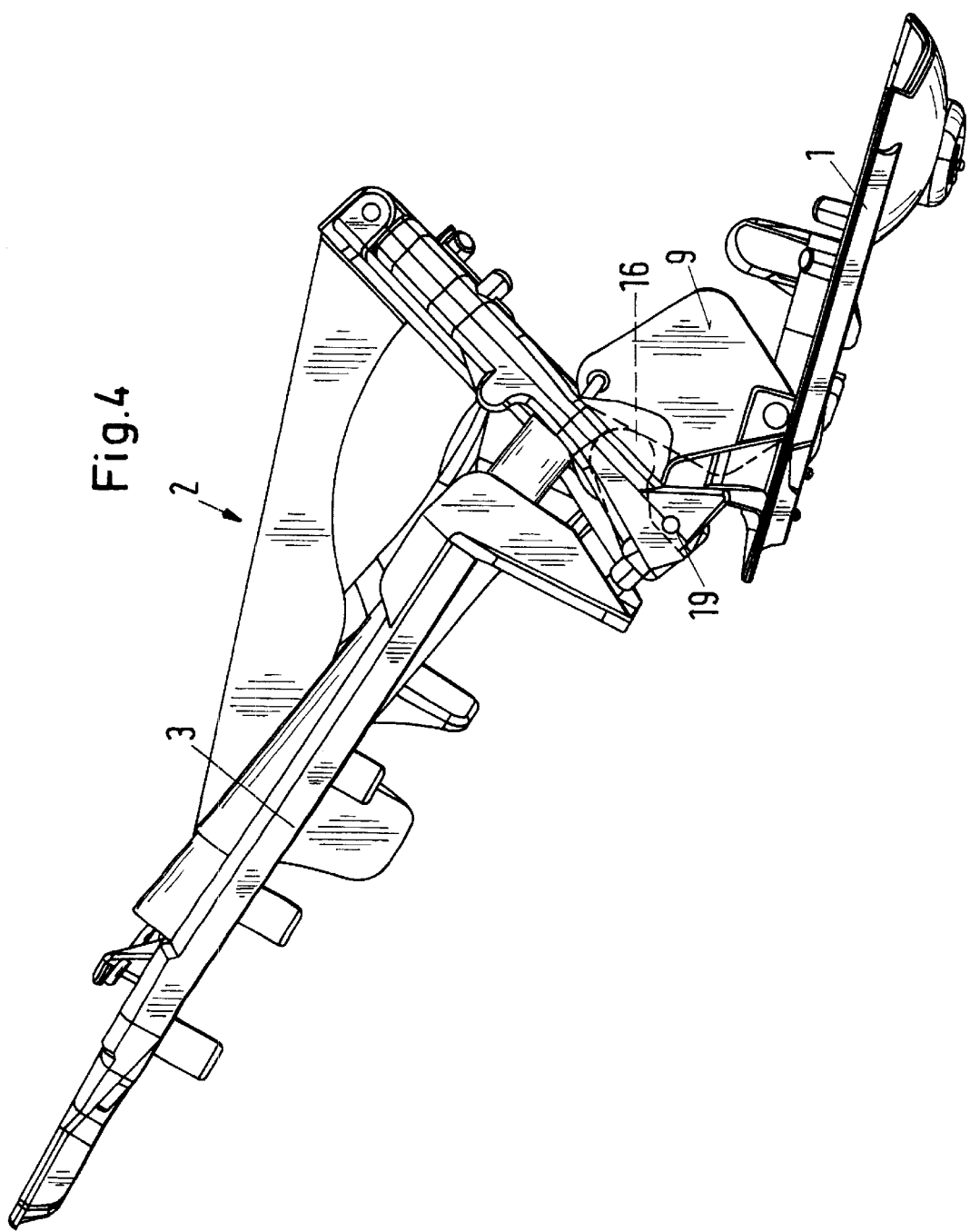

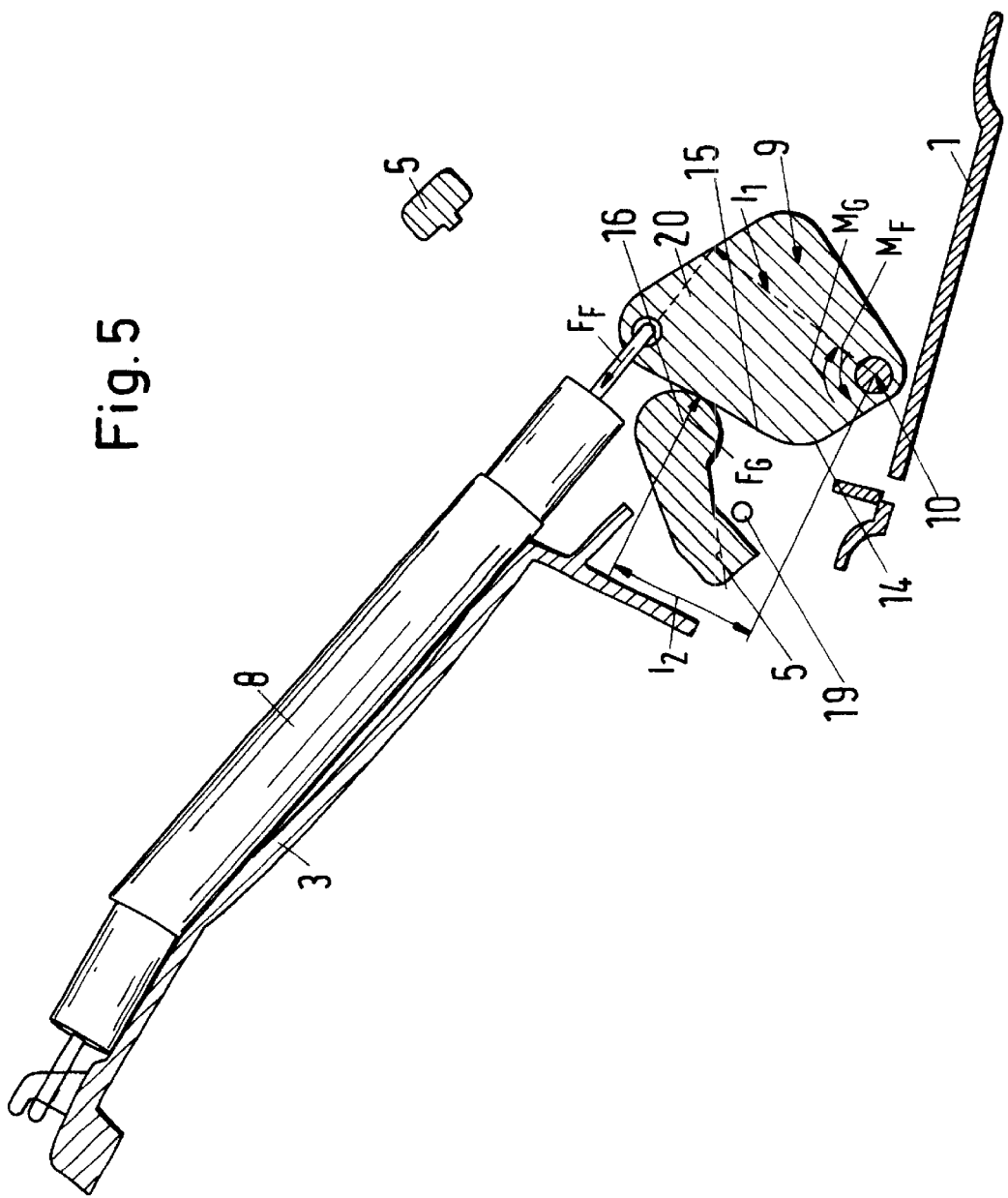

EXTERIOR REARVIEW MIRROR FOR VEHICLES, PREFERABLY MOTOR VEHICLES

BACKGROUND OF THE INVENTION

1. Field of the Invention

The invention relates to an exterior rearview mirror for vehicles, preferably for motor vehicles, comprising a mirror base and a mirror head which can be pivoted relative to the mirror base from a position of use into a parking position.

2. Description of the Related Art

The mirror head of exterior rearview mirrors can be pivoted from the position of use in a direction counter to the travel direction of the vehicle to the rear into a parking position. However, it may occur that in the parking position the mirror head accidentally moves relative to the mirror base, and this may result in damage to the mirror head.

SUMMARY OF THE INVENTION

It is an object of the present invention to configure the exterior rearview mirror of the aforementioned kind such that the mirror head, at least in the parking position, is secured properly and safely in its position.

In accordance with the present invention, this is achieved in that the mirror head is secured by a securing force at least in the parking position.

In the exterior rearview mirror according to the invention the mirror head is secured in the parking position by the securing force. The securing force ensures that the mirror head in the folded parking position is secured in its rest position so that undesirable movements of the mirror head in the parking position are prevented. The securing force can be advantageously also active in the position of use of the mirror head so that in this position the mirror head is also reliably prevented from performing undesirable movements.

BRIEF DESCRIPTION OF THE DRAWING

In the drawing:

FIG. 4 shows the exterior rearview mirror according to the invention whose mirror head is in a parking position; and FIG. 5 shows a detail of the exterior rearview mirror as shown in FIG. 4 with the securing device.

DESCRIPTION OF THE PREFERRED EMBODIMENTS

Figure 1:
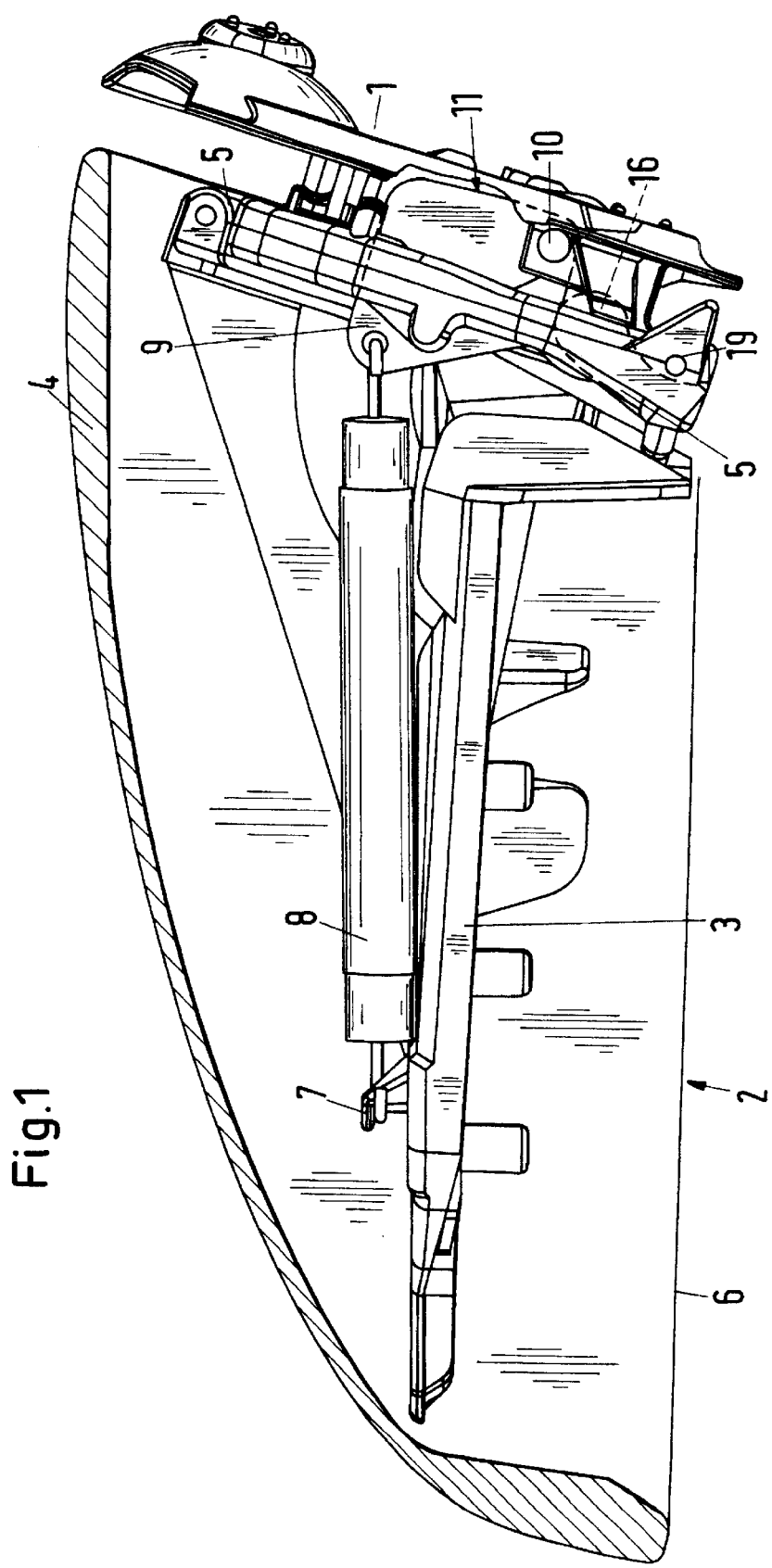
FIG. 1 is a cross-sectional view of the exterior rearview mirror according to the invention whose mirror head is in the position of use.

The exterior rearview mirror has a mirror base 1 with which it is fastened in a manner known in the art on the motor vehicle. The exterior rearview mirror is moreover provided with a mirror head 2 which can be pivoted from the position of use illustrated in FIG. 1 in and counter to the travel direction of the motor vehicle relative to the mirror base 1. The mirror head 2 has a support 3 which is arranged in the housing 4. The support 3 is pivotably connected by means of an intermediate joint 5 to the mirror base 1 (FIG. 2). On the support 3 a motor (not illustrated) for adjusting the mirror glass carrier (not illustrated) is supported. On its backside that is facing away from the opening 6 of the housing 4 receiving the mirror glass, the support 3 is provided with a projecting connecting part 7 in which the end of a tension spring 8 is secured. The other end of the spring 8 is secured on a cam disc 9 which is pivotable about a pivot axis 10 provided on the mirror base 1. The pivot axis 10 extends perpendicularly to the travel direction of the vehicle.

The cam disc 9 is a part of a securing arrangement 11 with which the mirror head 2 is secured in the parking position. As illustrated in FIG. 2, the cam disc 9 has a straight edge 12 facing the mirror base 1. At both ends, the edge 12 has an arc-shaped transition into edges 13 and 14 of the cam disc 9 which are positioned at a right angle to the edge 12. The edge 14 is shorter than the oppositely positioned, parallel edge 13. Both straight edges 13, 14 have an arc-shaped transition into a straight edge 15. In the position of use (solid lines in FIG. 2) of the mirror head 2 the edge 15 diverges relative to the mirror base 1 in the direction toward the housing opening 6. The pivot axis 10 on the mirror base 1 is located within the transition area between the two edges 12 and 14. The tension spring 8 is connected to the cam disc 9 at the corner area between the edges 13 and 15.

The securing arrangement 11 comprises also an intermediate joint 5 provided with a cam 16 which in the position of use of the mirror head 2 rests against the edge 14 of the cam disc 9. The cam 16 has a mantle surface 17 following the contour of an imaginary cylinder mantle and rests with this mantle surface 17 against the edge 14 of the cam disc 9. The axis of curvature 18 of the mantle surface 17 is positioned parallel to the pivot axis 10 of the cam disc 9. The cam 16 is advantageously embodied as a unitary or monolithic part of the intermediate joint 5; however, it can also be manufactured as a separate part. The cam 16 provides a support action for the cam disc 9 against the spring force $F_F$ exerted by the tension spring 8. The counter force $F_G$ acting on the cam 16 is positioned perpendicularly to the spring force $F_F$ (FIG. 2). The spring force $F_F$ generates on the cam disc 9 a torque $M_F$ about the pivot axis 10, while the counter force $F_G$ results in a corresponding counter torque $M_G$ about the pivot axis 10. The counter force $F_G$ ensures that the mirror head 2 remains at rest. By means of the tension spring 8 the cam disc 9 is forced securely against the cam 16 of the intermediate joint 5 so that an optimal rest position in the position of use of the mirror head 2 is ensured. In the position of use the torque $M_G$ is greater than the torque $M_F$.

Figure 2:
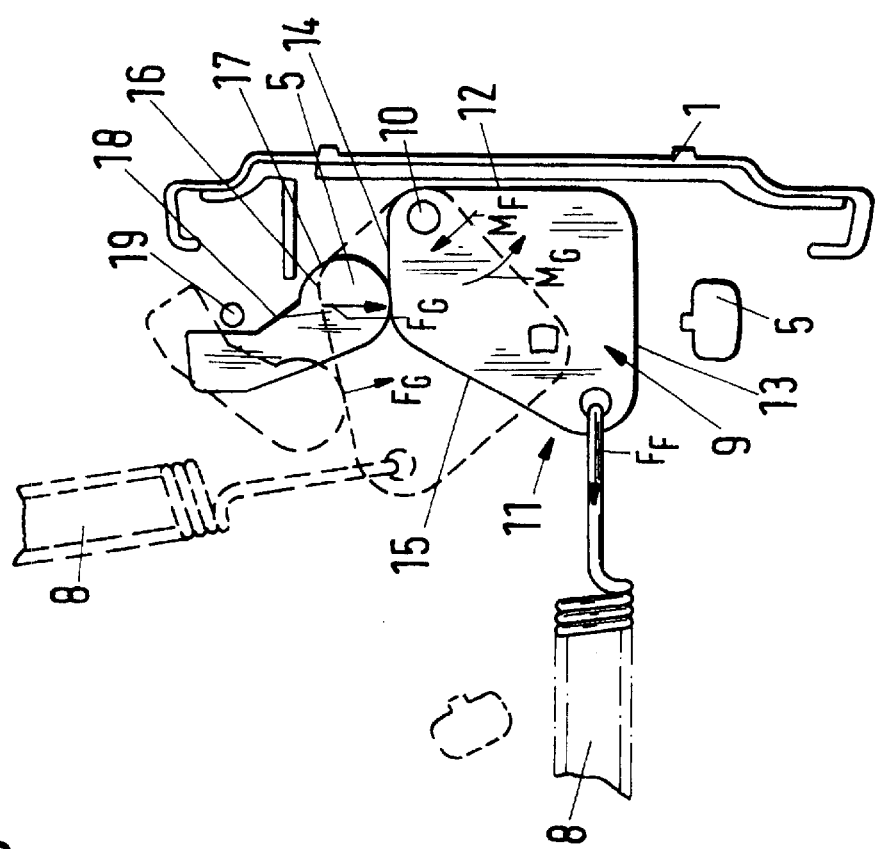
FIG. 2 shows the securing arrangement of the exterior rearview mirror according to the invention.
Figure 3:
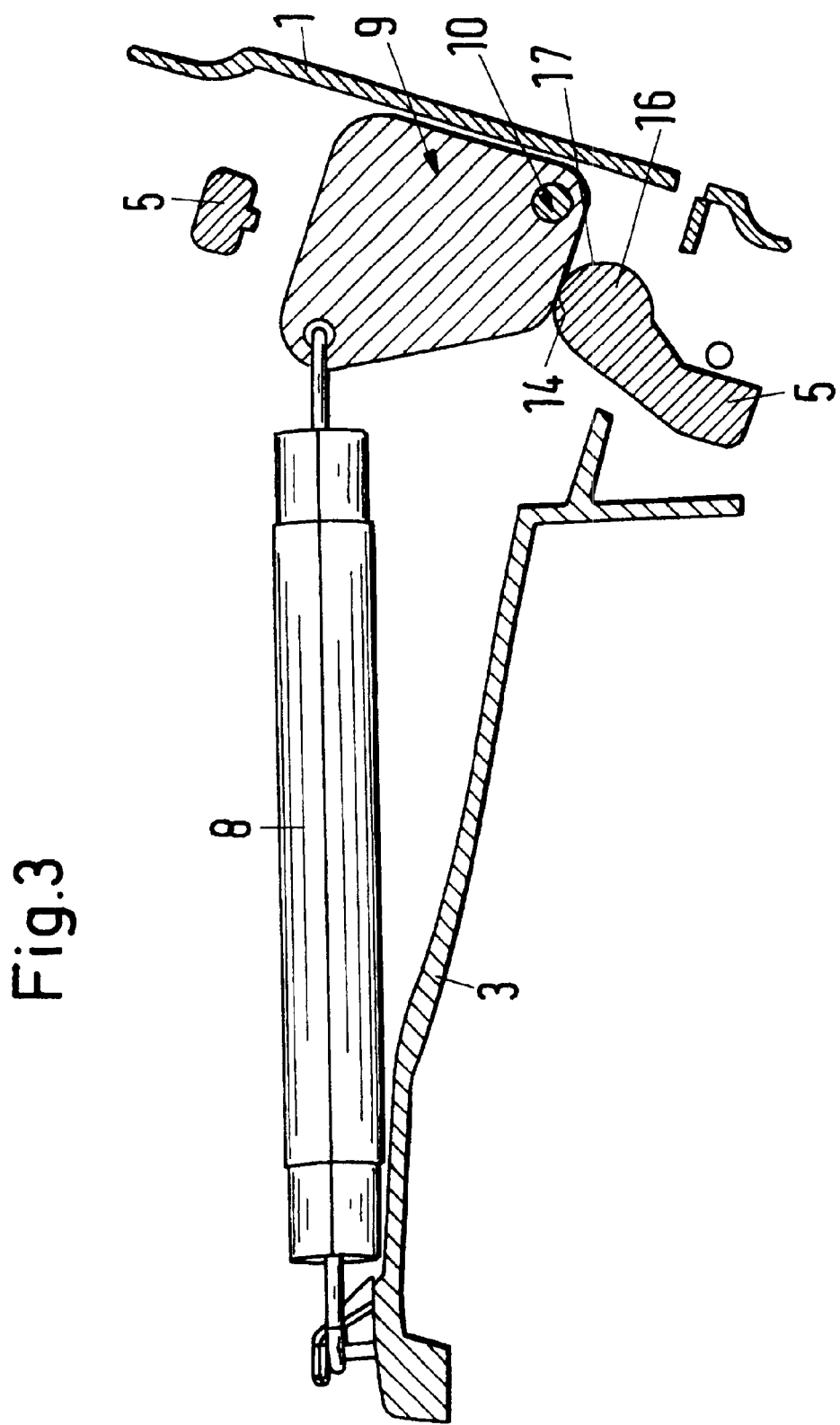
FIG. 3 shows in section the exterior rearview mirror according to FIG. 1, but without the cover of the mirror head.

The mirror head 2 can be pivoted from the position of use according to FIG. 1 and FIG. 3 into the parking position according to FIG. 4 and FIG. 5. For this purpose, the mirror head 2 is pivoted by means of the intermediate joint 5 about a joint axis 19 provided on the mirror base 1. The axis 19 extends parallel to the pivot axis 10 and is arranged in the travel direction of the vehicle at a spacing before the pivot axis 10. FIG. 2 shows, for the mirror being in the parking position, the position of the cam disc 9 and of the cam 16 as well as of the intermediate joint 5 in dashed lines. When pivoting the mirror head 2, the tension spring 8 is correspondingly entrained and rotates the cam disc 9 about the pivot axis 10. Since at the same time also the intermediate joint 5 is pivoted about the joint axis 19, the cam 16 of the intermediate joint 5 will move from the edge 14 onto the straight edge 15 of the cam disc 9 which adjoins at an obtuse angle the edge 14. This ensures that even in the parking position the cam 16 exerts the counter force $F_G$ onto the cam disc 9 which counter force $F_G$ is oriented in a direction opposite to the spring force $F_F$. Accordingly, in the parking position of the mirror the oppositely oriented torques $M_F$ and $M_G$ are acting also so that the mirror head 2 is secured properly and safely at rest in the parking position. The torque $M_G$ is smaller than the torque $M_F$ In the parking position. Since the cam 16 has a curved mantle surface 17, it moves reliably from the edge 14 onto the edge 15 of the cam disc 9 when pivoting of the cam disc 9 and of the intermediate joint 5 takes place.

The perpendicular spacing $I_1$ between the pivot axis 10 of the cam disc 9 and the action line of the spring force $F_F$ is greater than the perpendicular spacing $I_2$ between the pivot axis 10 of the cam disc 9 and the action line of the counter force $F_G$ exerted by the cam 16.

In the illustrated embodiment, the torque $M_G$ in the parking position is smaller than the torque $M_F$ resulting from the action of the tension spring 8 and acting on the cam disc 9 as a result of the geometry of the cam disc 9 and of the cam 16 as well as the force introduction.

It is also possible to secure the mirror head 2 in a rest position when the cam disc 9 within the edge 15 is provided with a catch depression 20 (FIG. 5) which is engaged in a positive-locking way like a snap connection by a contour of the intermediate joint 5, in the illustrated embodiment the contour of the shaped part 16.

It is, of course, also possible to provide the catch depression 20 within the edge 15 of the cam disc 9 in combination with the described force and torque conditions. The catch depression 20 is advantageously matched to the outer shape of the contour of the intermediate joint 5 so that in the parking position this contour of the intermediate joint 5 rests a really against the bottom of the catch depression 20.

While specific embodiments of the invention have been shown and described in detail to illustrate the inventive principles, it will be understood that the invention may be embodied otherwise without departing from such principles.

What is claimed is:

1. An exterior rearview mirror for motor vehicles, the exterior rearview mirror comprising:
    a mirror base (1) and a mirror head (2) connected to the mirror base (1), wherein the mirror head (2) is configured to pivot about a first pivot axis relative to the mirror base (1) from a position of use into a parking position;
    a securing device exerting a securing force ($F_G$) onto the mirror head (2) at least in the parking position;
    a spring device (8) exerting a spring force ($F_F$) onto the mirror head (2), wherein the securing force ($F_G$) counteracts the spring force ($F_F$);
    a cam disc (9) pivotably supported on the mirror base (1) about a second pivot axis (10), wherein the mirror head (2) has a support (3), wherein the spring device is a tension spring (8) having a first end connected to the cam disc (9) and having a second end connected to the support (3).

2. The exterior rearview mirror according to claim 1, wherein the second pivot axis (10) is parallel to the first pivot axis.

3. The exterior rearview mirror according to claim 1, further comprising an intermediate joint (5) connecting the mirror head (2) and the mirror base (1) to one another, wherein the intermediate joint (5) rotates about a joint axis (19) provided on the mirror base (1).

4. The exterior rearview mirror according to claim 3, wherein the cam disc (9) is supported on the intermediate joint (5) in the parking position.

5. The exterior rearview mirror according to claim 4, wherein the cam disc (9) is supported on the intermediate joint (5) in the position of use.

6. The exterior rearview mirror according to claim 3, wherein the intermediate joint (5) is the securing device.

7. The exterior rearview mirror according to claim 3, wherein the intermediate joint (5) has at least one shaped part (16) on which the cam disc (9) is supported.

8. The exterior rearview mirror according to claim 7, wherein the shaped part (16) has a cylindrical mantle surface (17) and rests with the cylindrical mantle surface (17) on the cam disc (9).

9. The exterior rearview mirror according to claim 7, wherein the shaped part (16) and the intermediate joint (5) are formed as a monolithic part.

10. The exterior rearview mirror according to claim 1, wherein the securing force ($F_G$) and the spring force ($F_F$) generate oppositely oriented torques acting on the cam disc (9).

11. The exterior rearview mirror according to claim 10, wherein in the position of use the torque generated by the spring force ($F_F$) is smaller than the torque generated by the securing force ($F_G$).

12. The exterior rearview mirror according to claim 1, further comprising an intermediate joint (5) connecting the mirror head (2) and the mirror base (1) to one another, wherein the intermediate joint (5) rotates about a joint axis (19) provided on the mirror base (1), wherein the mirror head (2) in the parking position is secured by a snap connection on the intermediate joint (5).

13. An exterior rearview mirror for motor vehicles, the exterior rearview mirror comprising:
    a mirror base (1) and a mirror head (2) connected to the mirror base (1), wherein the mirror head (2) is configured to pivot about a first pivot axis relative to the mirror base (1) from a position of use into a parking position;
    a securing device exerting a securing force ($F_G$) onto the mirror head (2) at least in the parking position;
    an intermediate joint (5) connecting the mirror head (2) and the mirror base (1) to one another, wherein the intermediate joint (5) rotates about a joint axis (19) provided on the mirror base (1), wherein the mirror head (2) in the parking position is secured by a snap connection on the intermediate joint (5);
    wherein the mirror head (2) has a cam disc (9) having at least one catch depression (20) configured to cooperate with the intermediate joint (5).

14. The exterior rearview mirror according to claim 13, wherein the intermediate joint (15) has a shaped part (16) configured to engage the catch depression (20) of the cam disc (9).

* * * * *